Figure 1:
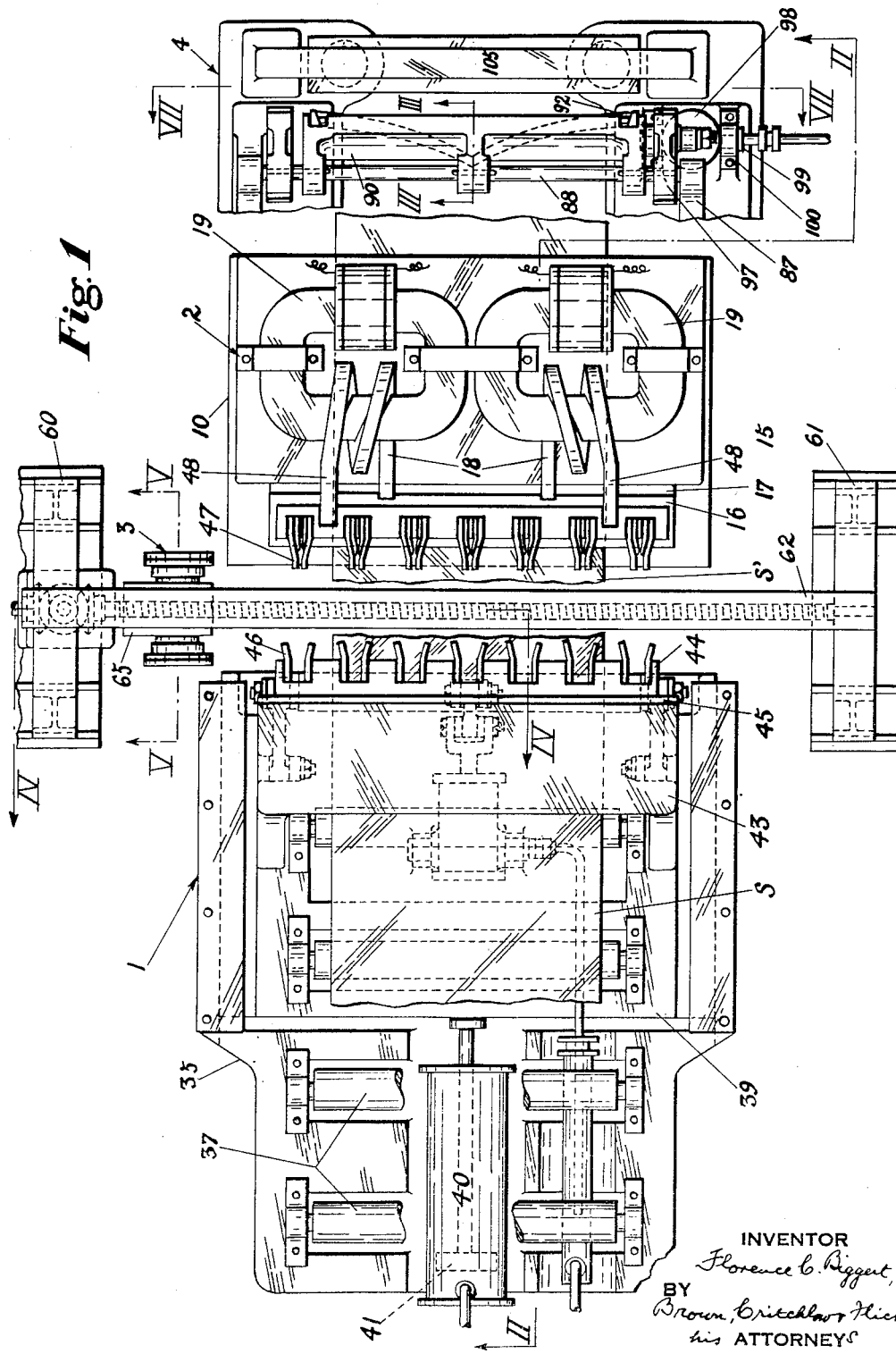

Nov. 28, 1939.                F. C. BIGGERT, JR                2,181,502
              APPARATUS FOR WELDING METAL STRIP END TO END
                  Filed June 24, 1937         4 Sheets-Sheet 1

INVENTOR
Florence C. Biggert, Jr
BY
Brown, Critchlow & Flick
his ATTORNEYS

Nov. 28, 1939.   F. C. BIGGERT, JR   2,181,502
APPARATUS FOR WELDING METAL STRIP END TO END
Filed June 24, 1937    4 Sheets-Sheet 2
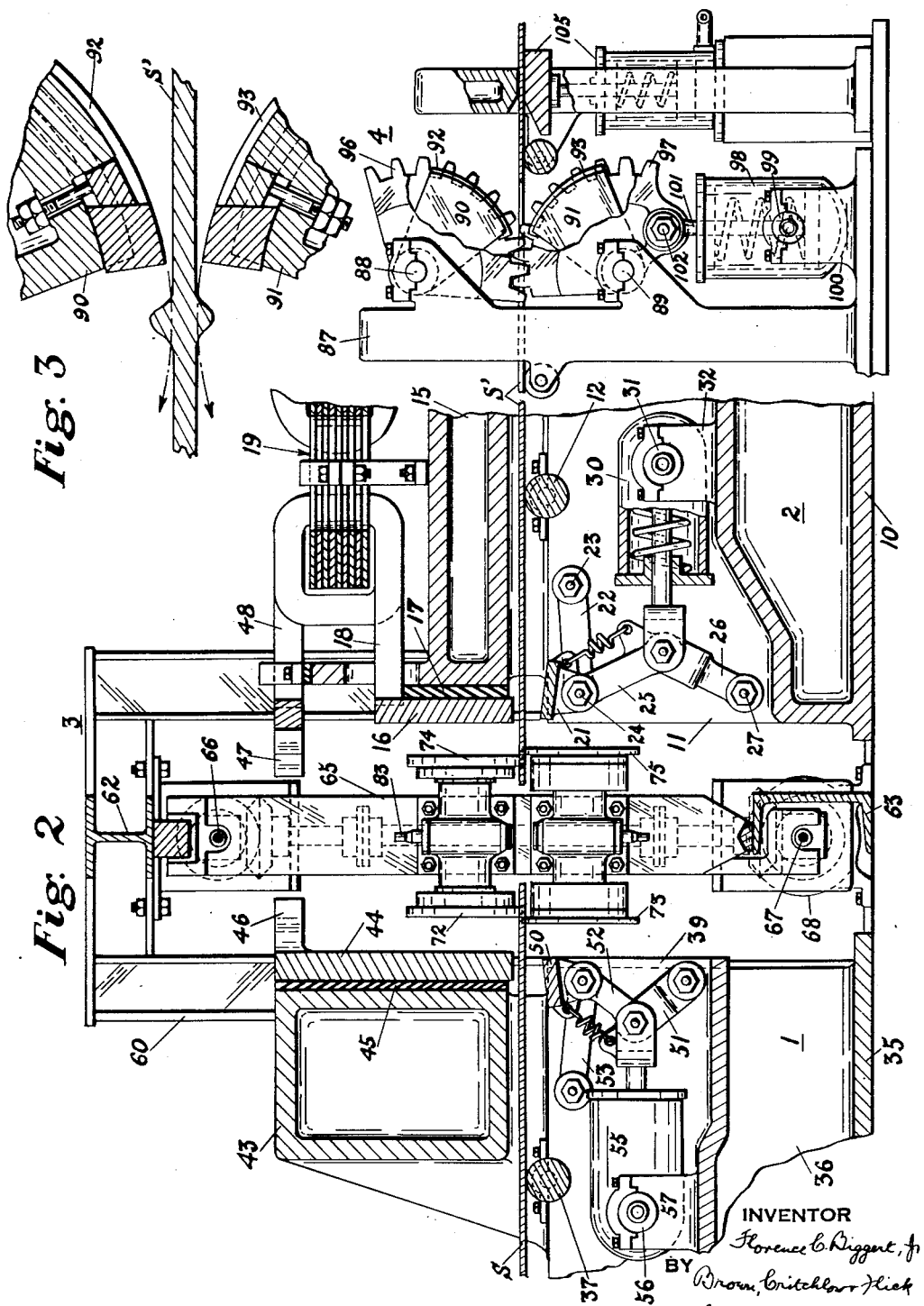
INVENTOR
Florence C. Biggert, Jr.
BY Brown, Critchlow + Hick
his ATTORNEYS

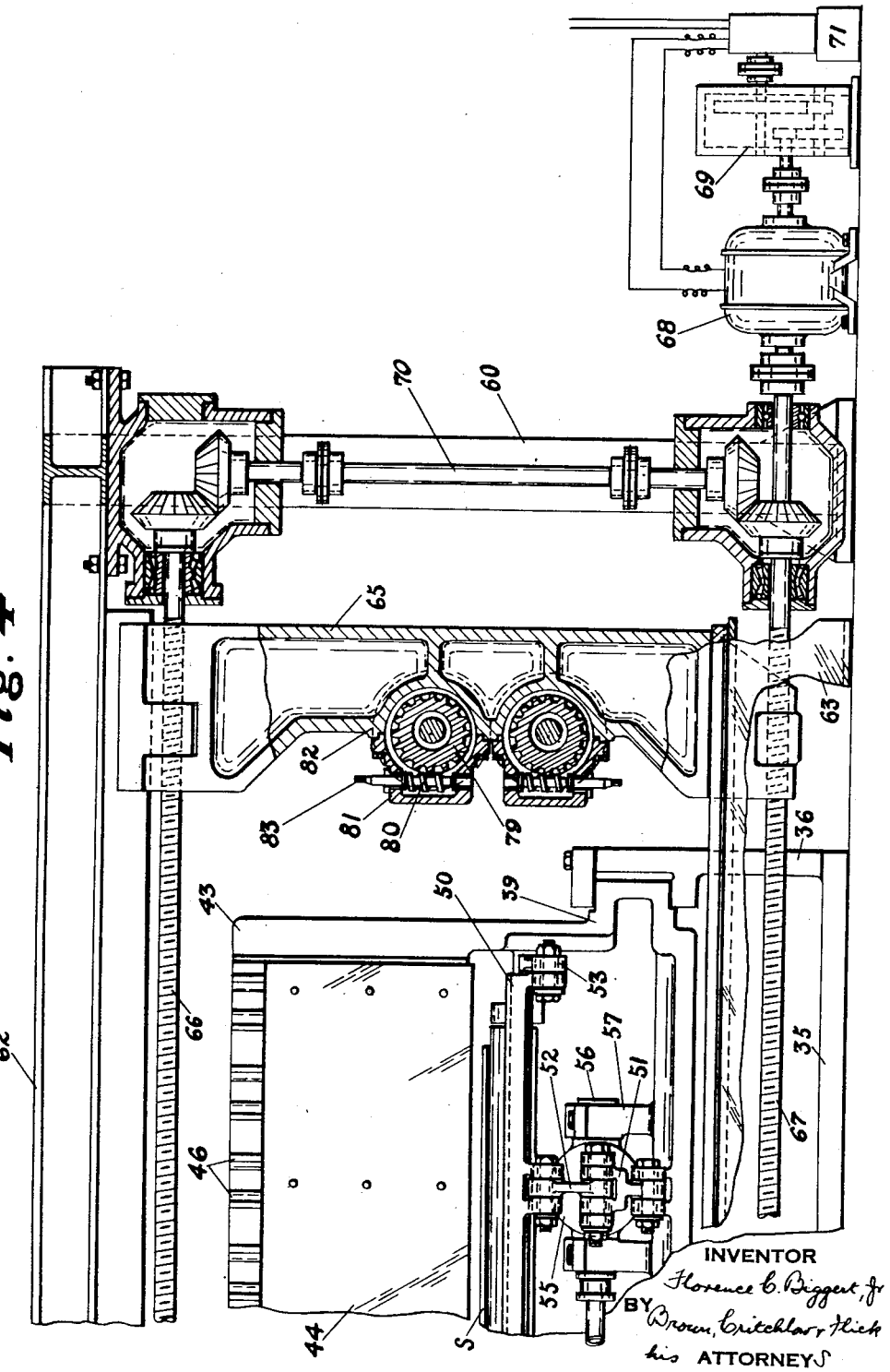

Nov. 28, 1939.   F. C. BIGGERT, JR   2,181,502
APPARATUS FOR WELDING METAL STRIP END TO END
Filed June 24, 1937    4 Sheets-Sheet 4
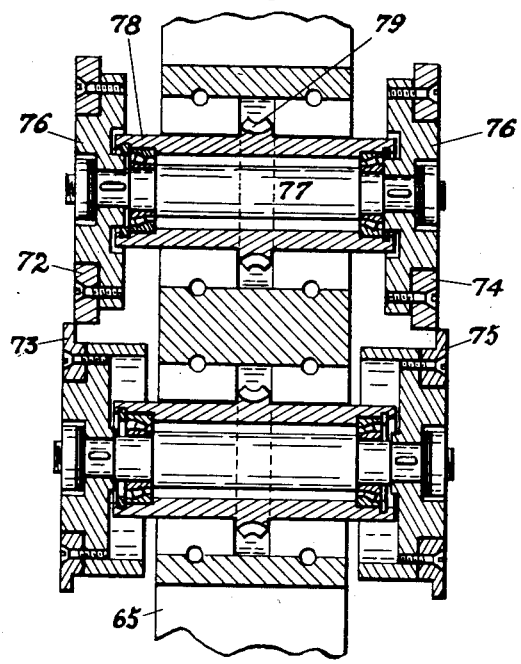
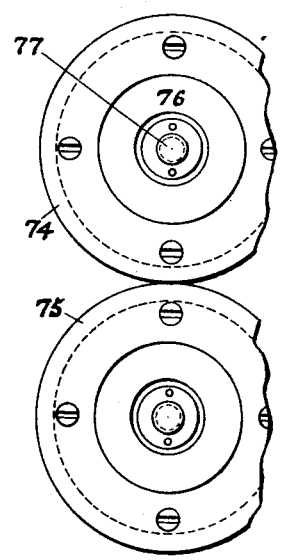
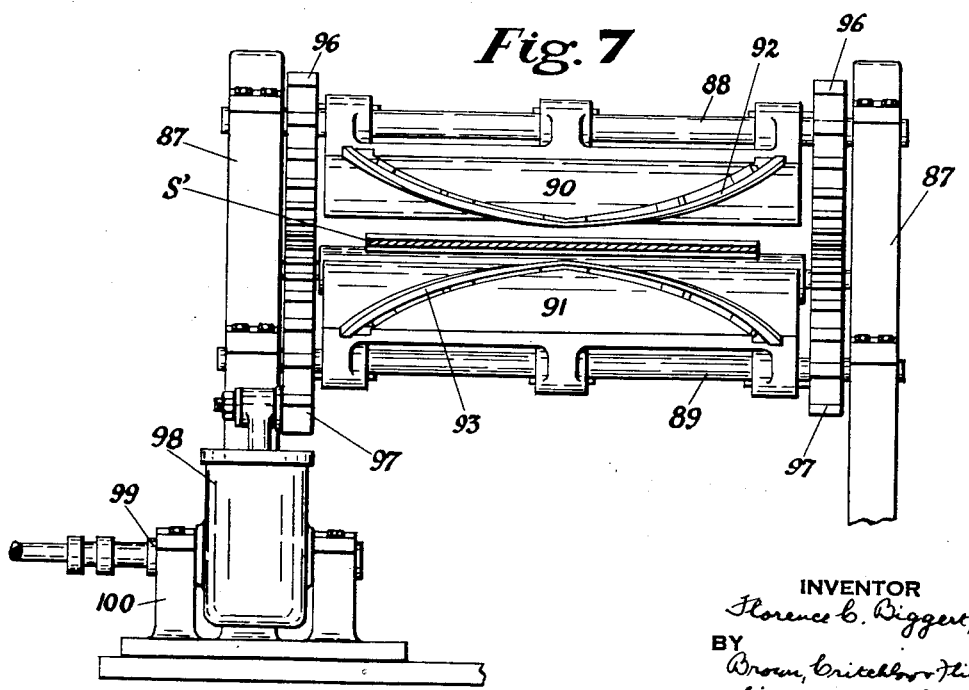
INVENTOR
Florence C. Biggert, Jr
BY
Brown, Critchlow & Flick
his ATTORNEYS Patented Nov. 28, 1939

2,181,502

UNITED STATES PATENT OFFICE 2,181,502

APPARATUS FOR WELDING METAL STRIP END TO END

Florence C. Biggert, Jr., Crafton, Pa., assignor to United Engineering & Foundry Company, Pittsburgh, Pa., a corporation of Pennsylvania Application June 24, 1937, Serial No. 150,055

4 Claims. (Cl. 29—33)

This invention relates to welding metal strip end to end, and more particularly is concerned with improved methods and apparatus for electrically flash welding strip end to end and thereafter trimming the flash from the line of weld.

It is the general object of my invention to provide improved methods and apparatus for commercially butt-welding metal strip end to end.

Another object of my invention is the provision of improved methods and apparatus for electrically flash welding metal strip end to end wherein the ends of the strips are aligned, clamped, sheared, welded and the flash removed from the line of weld.

Another object of my invention is to provide improved rotary means for trimming flash from a welded seam which means are adapted to engage with the flash or the materials welded only during the flash removing operation and at points immediately adjacent the line of weld.

Another object of my invention is the provision of apparatus for joining metal strips end to end with a butt-weld wherein means are provided for clamping the strip ends in aligned relation, and a laterally movable shear is incorporated for movement between the clamps to trim and prepare the strip ends for welding, the clamps being movable toward each other to effect flash trimming of the strip ends together.

The foregoing and other objects of my invention are achieved by the provision of a method which comprises clamping the strip ends in aligned relation, shearing the strip ends to prepare them for welding, connecting the ends of the strips to a source of low potential high amperage current, effecting relative movement between the strip ends to flash weld the strip ends together and thereafter shearing the flash from the line of weld by a rotary movement of helical knives.

My improved apparatus for welding strip end to end includes means for supporting the strip ends substantially in alignment with each other, means for clamping the strip ends, means movable between the clamps for shearing both strip ends while clamped, means for supplying low potential high amperage current to the clamps, and means for effecting relative movement between the clamps so that when the clamps are moved toward each other the sheared strip ends held thereby are flash welded together. Completing the combination are means for effecting relative movement between the welded strip and at least one of the clamping means, helically curved blades mounted for rotary movement above and below the strip, and means for rotating the blades when the line of weld is positioned therebetween to trim the flash from the weld.

For a better understanding of my invention reference should be had to the accompanying drawings, wherein Fig. 1 is a plan view of one embodiment of apparatus incorporating the principles of my invention; Fig. 2 is a longitudinal, vertical, cross-sectional view taken on line II—II of Fig. 1 and on a somewhat larger scale; Fig. 3 is an enlarged longitudinal, vertical sectional view taken on line III—III of Fig. 1; Fig. 4 is a transverse vertical cross-sectional view taken on line IV—IV of Fig. 1; Fig. 5 is a vertical cross-sectional view through the shear mechanism associated with the apparatus as taken on line V—V of Fig. 1; Fig. 6 is an end elevation of the shear mechanism shown in Fig. 5; and Fig. 7 is a transverse vertical cross-sectional view taken on line VII—VII of Fig. 1.

General assembly

The embodiment of my invention illustrated in the accompanying drawings includes strip clamping and welding apparatus indicated generally by the numerals 1 and 2, which apparatus is formed in two parts which are in spaced parallel relation so as to allow the introduction of shearing mechanism, shown generally at 3, therebetween. Completing the assembly is mechanism for removing the flash from the line of weld and this mechanism is indicated generally by the numeral 4. The strip ends operated on are indicated, respectively, by the letters S and S'.

Strip clamping and welding apparatus

The strip clamping and welding apparatus in the form of my invention illustrated includes, as best seen in Fig. 2, a base 10 having upright sides 11 across which are bridged one or more conveyor rollers 12 adapted to slidably support the strip end S'. The rollers 12 may be driven, if desired, although this is not essential inasmuch as the metal strip is, ordinarily, adapted to be moved in any desired manner to and through the welding apparatus, as for example, by the use of coilers, pinch rolls or rolling mills.

Mounted upon the uprights 11 and above the conveyor rollers 12 is a transverse head 15 which carries a fixed clamping jaw 16 just above the upper surface of the strip S'. Preferably the jaw 16 is insulated from the head 15 by a block 17 and is connected by a lead 18 with a source of low potential high amperage electric current, as for example, one terminal of the secondary winding of a transformer, indicated generally at 19. Cooperating with the jaw 16 is a clamping jaw 21 which is mounted for movement toward and from the under side of the strip end S' opposite the jaw 16. This may be accomplished by mounting the jaw 21 upon a link 22 which is pivotally secured as at 23 to the upright 11. The jaw 21 may be pivotally carried on the link 22, as by a pin 24, which likewise pivotally carries the end of a toggle link 25 which forms a part of toggle linkage including link 26 pivotally secured as at 27 to the uprights 11. The toggle links 25 and 26 are operated in any desired manner as by the provision of a fluid pressure motor 30 which is formed with trunnions 31 pivotally received in suitable brackets 32 mounted upon the base 10. The jaw 21 preferably has an insulated face to prevent the leakage of welding current therethrough as hereinafter described.

Positioned in spaced parallel relation to the base 10 so as to permit the shear mechanism 3 to be positioned therebetween is a base 35 having upright sides 36 across which are bridged conveyor rollers 37 similar to the rollers 12 and adapted to support the strip end S, as will be understood. Slidably mounted on the base 35 in any suitable manner is a carriage 39 which is adapted to be moved toward and from the base 10 which may be accomplished by the provision of a fluid pressure motor 40 carried on the base 35 and having a plunger 41 secured to the carriage 39 (see Fig. 1). Mounted on or formed integral with the carriage 39 is a head 43 which carries a clamping jaw 44 on its upright face so that the jaw is positioned just above the upper surface of the strip S. The clamping jaw 44 is preferably insulated from the head 43 as by a block 45 and is formed with a plurality of contact jaws 46 adapted to receive contact blades 47 carried on the head 15 and connected by suitable leads 48 with the second terminal of the secondary winding of the transformer 19. Thus when the carriage 39 is moved into the extreme position toward the base 10, as hereinafter described, the secondary current from the transformer 19 is electrically connected to the jaw 44.

Cooperating with the jaw 44 is a clamping jaw 50 which is mounted for movement to and from the jaw 44 in any suitable manner. This may be accomplished by the provision of toggle links 51 and 52 which are pivotally connected, respectively, to the sides of the carriage 39 and to the jaw 50. A link 53 pivotally connected to the carriage 39 and to the jaw 50 holds the upper end of the toggle linkage for the desired movement of the jaw 50 toward and from the jaw 44. The toggle links 51 and 52 may be operated by a fluid pressure motor 55 which is formed with trunnions 56 rotatably carried by brackets 57 mounted upon the carriage 39. The jaw 50 preferably has an insulated face to prevent the leakage of welding current therethrough, as will be understood.

Shear mechanism

Positioned between the bases 10 and 35 of the clamping and welding apparatus 1 and 2 is the shear mechanism 3 which includes upright frames 60 and 61 which are positioned laterally of the clamping and welding apparatus and which are connected together at their upper and lower ends by a transversely extending beam 62 and channel 63, respectively. From Fig. 2 it will be recognized that the beam 62 and channel 63 are positioned vertically above and vertically below the carriage 39 so that they do not interfere with the movement of the carriage toward the base 10 during the welding operation.

Slidably carried between the beam 62 and channel 63 is a cross-head indicated generally at 65 and which is adapted to be driven along between the beam and channel. This may be accomplished by the provision of screw shafts 66 and 67 at the under side of the beam and channel which are adapted to be rotated by motor 68 operating through appropriate gears and shafting 70. Speed reducing gear box 69 serves to operate limit switch 71 by motor 68, the number of revolutions of which in both directions being thereby limited to correspond to the extreme right and left side positions of cross-head 65.

The cross-head 65 carries a double pair of co-operating shearing rings 72—73 and 74—75. The rings 72 and 74 are mounted upon discs 76, axially adjustably mounted on shaft 77, which is rotatably carried in suitable bearings held by a hub 78. The hub 78 may mount the shaft 77 eccentrically so that by providing for angular adjustment of the hub, the working position of the shaft 77 and the associated shearing rings 72 and 74, may be adjusted. Angular adjustment of the hub 78 may be obtained by providing a worm gear 79 thereon which, as best shown in Fig. 4, engages with a worm 80 carried by a suitable bracket 81 formed on a housing 82 rotatably receiving the hub 78 and formed integral with the cross-head 65. The worm 80 may be hand adjusted by the application of a wrench to a squared end 83 formed upon the shaft carrying the worm. Since the shear rings 73 and 75 are illustrated as being mounted similarly to the rings 72 and 74, and just described, their mounting will not be described in detail.

Flash trimming apparatus

The flash trimming apparatus includes a frame 87 having transversely extending shafts 88 and 89 positioned above and below the strip S' and carrying arcuate sector-shaped portions 90 and 91, respectively. The portions 90 and 91 removably and adjustably carry curved shear blades or knives 92 and 93, of a helical shape, which are adapted to engage with the flash to trim it from the line of weld, as hereinafter described. As shown in Fig. 7 of the drawings, the blades 92 and 93 are each formed with a double helical curve so that the cutting edge engages first with the center of the transversely extending flash and then laterally outwardly on both sides of the center. In other words, the cutting action is that of a V-shaped or plough-shaped blade and side thrust on the strip is neutralized. It should be understood, however, that a continuously helical or a lawnmower-like blade may be employed. Mounted upon the shafts 88 and 89 are arcuate sector gears 96 and 97 which engage with each other so that the operation of the blades 92 and 93 is synchronized. Suitable means are provided for effecting shearing movement of the blades and in the embodiment of the invention illustrated these means have been illustrated as comprising a fluid pressure motor 98 formed with side trunnions 99 pivotally carried in brackets 100 secured to the base of the frame 87. The piston rod 101 of the fluid pressure motor 98 is pivotally secured as at 102 to the sector gear 97.

While I contemplate operating the blades 92 and 93 in a direction toward or from the welding apparatus, in order to effect the flash removing operation, the invention has been illustrated as operating toward the welding apparatus during the shearing operation as seen in Fig. 3. Accordingly, clamping mechanism 105 of any suitable type for clamping the welded strip and holding the strip during the flash trimming operation is provided.

The particular advantage of rotary cutting blades of the type herein described is particularly evident from Fig. 3, from which it will be seen that in the flash trimming operation the blades 92 and 93 come into engagement with the strip and the flash only adjacent the line of weld and during the movement of the blades past substantially a line joining the centers of the blades supporting shafts 88 and 89. This is advantageous for the reason that where knives are mounted so that they cut with a movement substantially parallel to the plane of the strip, scale, dirt and other deposits on the strip have been found to quickly dull the knives and require frequent sharpening or replacement thereof.

It should be understood that I contemplate eliminating the clamping mechanism 105 and holding the welded strip by one of the clamps heretofore described and associated with the welding apparatus during the flash trimming operation. In this case the blades 92 and 93 are formed with the cutting edge on the other side and are moved away from the welding apparatus to perform their rocking flash trimming operation.

Operation

In the operation of the embodiment of my invention heretofore specifically described, and in accordance with the method of my invention, the ends of metal strips to be welded together are fed into the welding apparatus with the crosshead 65 of the shear mechanism in the retracted or lateral position shown in Fig. 4. After the strip ends are aligned with each other and positioned so that the shear will remove the requisite end portions to prepare the strip ends for welding they are clamped between the jaws 16 and 21 and the jaws 44 and 50 by operation of the fluid pressure motors 30 and 55. Once clamped the carriage 65 is driven between the clamping jaws by the motor 68 and the shear rings 74 and 75 cut off the end of the strip 'S' to prepare it for welding and the shear rings 72 and 73 cut off the end of the strip S to prepare it for welding. The cross-head 65 is returned to its initial position and the carriage 39 is moved toward the base 10 by operation of the fluid pressure motor 40 which brings the ends of the strips into flash welding relation. Just before the ends of the strips engage for the flash welding operation, the contact jaws 46 of the clamping jaw 44 engage with the contact plugs 47 so that the strips to be welded are connected with the terminals of the secondary winding of the transformer 19. Thus when the strip ends are brought completely together by the continued forward movement of the carriage 39, they are flash welded in abutting relation. In this connection it is to be noted that the shear rings 74—75 and 72—73 cut the ends of the strips off relatively close to the supporting clamps so that without releasing the clamping jaws the strip ends are properly held for the flash welding operation.

Once the strip ends are flash welded end to end in known fashion, the fluid pressure motors 30 and 55 are operated to move the clamping jaws 21 and 50 away from the strip to release it so that it can be moved longitudinally of the welding apparatus to position the line of weld substantially between the shafts 88 and 89 of the flash trimming apparatus. Operation of the fluid pressure motor 98 causes the rocking of the blade supporting sectors 90 and 91 to bring the blades 92 and 93 into engagement with the flash, as shown in Fig. 3, to trim it from the strip. The resulting strip is then passed to a rolling mill, is wound upon a coiler or is treated in any way desired, and additional strips may be welded thereto or to each other by a repetition of the cycle of operations just described.

Summary

From the foregoing it will be recognized that the objects of my invention have been achieved by the provision of improved methods and apparatus for welding metal strip end to end and for trimming the flash from the line of weld. The apparatus is relatively simple and inexpensive and is easily operated and is particularly adapted for commercial production purposes and for efficiencies of manufacture. Maintenance costs are reduced and the entire welding operation is quickly and effectively accomplished.

It should be understood that I contemplate the use of other than disc shearing mechanism for trimming the ends of the strip prior to welding. The strip may be trimmed by reciprocating shear mechanism which may move either vertically or laterally away from between the clamping jaws once its operation has been performed. Again the exact shape of the flash trimming knives may be widely varied as can their exact operation. Other modifications of the methods and apparatus of my invention will occur to the man skilled in the art. Therefore while one embodiment of my invention has been illustrated and described in detail, various modifications of the apparatus and method can be made without departing from the scope of my invention as defined in the appended claims.

I claim:

1. In apparatus for welding metal strip together in end-to-end relation, spaced apart means for clamping the strip ends in an aligned position, a carriage mounted for lateral movement between the spaced apart clamping means, a pair of rotary disc shears carried on each side of the carriage and each adapted to engage with a strip end, means for moving the carriage laterally to shear progressively and substantially simultaneously the ends of the strips to prepare them for welding, and also to move the carriage out of the path of movement of the clamps, and means for moving the clamping means towards each other to position the strip ends for welding.

2. In apparatus for welding metal strip together in end-to-end relation, spaced apart means for clamping the strip ends in an aligned position, a carriage mounted for lateral movement between the spaced apart clamping means, a pair of shearing means carried on each side of the carriage and each adapted to engage with a strip end, means for moving the carriage laterally to shear progressively and substantially simultaneously the ends of the strips to prepare them for welding, and thereafter to move the carriage out of the way from between the clamping means, and means for moving the strip ends towards each other to position them for welding.

3. In apparatus for welding metal strip together in end-to-end relation, spaced apart means for clamping the strip ends in an aligned position, a narrow carriage mounted for movement between the ends of the strips and the spaced apart clamping means, a pair of shearing means carried on each side of the carriage and each adapted to engage with a strip end, means for moving the carriage to shear progressively and substantially simultaneously the ends of the strips to prepare them for welding, and also to move the carriage out of the path of movement of the strip ends, and means for moving the strip ends towards each other to position the strip ends for welding.

4. In apparatus for welding metal strip together in end-to-end relation, means for supporting the strip ends substantially in alignment with each other but spaced apart, spaced apart means for clamping the strip ends in an aligned position, a narrow carriage mounted for movement between the ends of the strips and the spaced apart clamping means, a pair of shearing means carried on each side of the carriage and each adapted to engage with a strip end, means for moving the carriage to shear progressively and substantially simultaneously the ends of the strips to prepare them for welding, and thereafter to move the carriage out of the way from between the clamps, means for supplying low voltage, high amperage current to the clamping means, and means for moving the clamping means towards each other to flash weld the strip ends together.

FLORENCE C. BIGGERT, Jr.